(12) United States Patent
Xu et al.

(10) Patent No.: US 10,128,004 B2
(45) Date of Patent: Nov. 13, 2018

(54) HIGH TEMPERATURE STRENGTH, CORROSION RESISTANT, ACCIDENT TOLERANT NUCLEAR FUEL ASSEMBLY GRID

(71) Applicant: WESTINGHOUSE ELECTRIC COMPANY LLC, Cranberry Township, PA (US)

(72) Inventors: Peng Xu, Columbia, SC (US); Edward J. Lahoda, Edgewood, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 1257 days.

(21) Appl. No.: 14/046,012

(22) Filed: Oct. 4, 2013

(65) Prior Publication Data

US 2015/0098546 A1    Apr. 9, 2015

(51) Int. Cl.
*G21C 3/34* (2006.01)
*G21C 3/32* (2006.01)
(Continued)

(52) U.S. Cl.
CPC .............. *G21C 3/34* (2013.01); *G21C 3/32* (2013.01); *G21C 3/3305* (2013.01); *G21C 21/00* (2013.01); *Y02E 30/40* (2013.01)

(58) Field of Classification Search
CPC . G21C 3/34; G21C 3/33; G21C 3/332; G21C 3/3424
(Continued)

(56) References Cited

U.S. PATENT DOCUMENTS 3,454,396 A * 7/1969 Johnson ..................... B22F 7/02
                                                   376/421
4,863,538 A    9/1989 Deckard
(Continued)

FOREIGN PATENT DOCUMENTS

| EP | 2088601 B1 | 10/2012 |
|---|---|---|
| JP | 2007-237063 A | 9/2007 |
| WO | 2011042406 A1 | 4/2011 |

OTHER PUBLICATIONS

Hu, Liangfa, et al. "Processing and characterization of porous Ti 2 AlC with controlled porosity and pore size." Acta Materialia 60.18 (2012): 6266-6277. Available online: <http://www.dtic.mil/dtic/tr/fulltext/u2/a584237.pdf>.*

(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

The invention pertains to a nuclear fuel assembly grid or a portion or a part of the grid, such as a grid strap and/or an integral flow mixer that is at least partially constructed of a composition containing one or more ternary compounds of the general formula I:

$$M_{n+1}AX_n \qquad (I)$$

wherein, M is a transition metal, A is an element selected from the group A elements in the Chemical Periodic Table, X is carbon or nitrogen, and n is an integer from 1 to 3.

The invention further pertains to a method of making the nuclear fuel assembly grid or a portion of a part of the grid, by employing a sintering process to sinter the composition containing one or more ternary compounds in powder form such that the resulting grid or a portion of or a part of the grid includes a plurality of sintered layers.

8 Claims, 14 Drawing Sheets

(51) Int. Cl.
*G21C 3/33* (2006.01)
*G21C 21/00* (2006.01)
(58) Field of Classification Search
USPC ........................................................ 376/438
See application file for complete search history.

(56) References Cited

U.S. PATENT DOCUMENTS

| | | | |
|---|---|---|---|
| 5,026,517 | A | 6/1991 | Menken et al. |
| 6,144,716 | A | 11/2000 | Nguyen et al. |
| 6,226,342 | B1 * | 5/2001 | Micko .................... G21C 3/336 376/305 |
| 6,231,969 | B1 | 5/2001 | Knight et al. |
| 8,358,733 | B2 | 1/2013 | Jiang |
| 8,374,308 | B2 | 2/2013 | Jiang |
| 2005/0061408 | A1 | 3/2005 | Charquet et al. |
| 2012/0114091 | A1 | 5/2012 | Ishibashi et al. |
| 2012/0201343 | A1 | 8/2012 | Ravenet |

OTHER PUBLICATIONS

Barnes, L. A., NL Dietz Rago, and L. Leibowitz. "Corrosion of ternary carbides by molten lead." Journal of Nuclear Materials 373.1 (2008): 424-428. Available online: <http://www.sciencedirect.com/science/article/pii/S0022311507007933>.*

Utili, M., et al. "Ti 3 SiC 2 as a candidate material for lead cooled fast reactor." Nuclear Engineering and design 241.5 (2011): 1295-1300. Available online: <http://www.sciencedirect.com/science/article/pii/S0029549310005200>.*

Youinou et al. Enhanced Accident Tolerant Fuels for LWRs—A Preliminary Systems Analysis. Idaho National Laboratory. Sep. 2013. Available online: <https://inldigitallibrary.inl.gov/sti/5869831.pdf>.*

Ganguly, Adrish, Michel W. Barsoum, and Roger D. Doherty. "Interdiffusion between Ti3SiC2—Ti3GeC2 and Ti2AlC—Nb2AlC diffusion couples." Journal of the American Ceramic Society 90.7 (2007): 2200-2204.*

Sun, Z. M. "Progress in research and development on MAX phases: a family of layered ternary compounds." International Materials Reviews 56.3 (2011): 143-166.*

International Search Report and Written Opinion of the International Searching Authority for PCT/US2014/051197 dated Dec. 12, 2014 (Forms PCT/ISA/220, PCT/ISA/210, PCT/ISA/237).

A. Kakitsuji, "Synthesis of TlAl(Cr)Ti2AlC Composites by Reactive Arc-Melting", Materials Transactions, 43[10], 2589-2592 (2002).

Extended European search report for 14850753.6-1556/3053169-PCT/US2014051197, dated May 30, 2017, seven pages.

* cited by examiner

HIGH TEMPERATURE STRENGTH, CORROSION RESISTANT, ACCIDENT TOLERANT NUCLEAR FUEL ASSEMBLY GRID

BACKGROUND

1. Field

This invention pertains generally to nuclear reactor fuel assemblies and more particularly to nuclear reactor fuel assemblies that employ a spacer or mixer or support grid constructed of a high temperature strength, corrosion resistant, accident tolerant composition, and methods of making the spacer or mixer or support grid.

2. Description of Related Art

In most pressurized water nuclear reactors (PWRs), boiling water reactors (BWRs) and heavy water reactors (HWRs), collectively referred to herein as water reactors, the reactor core is comprised of a large number of elongated fuel assemblies that generate the reactive power of the reactor. These fuel assemblies typically include a plurality of fuel rods held in an organized, array by a plurality of grids spaced axially along the fuel assembly length and attached to a plurality of elongated thimble tubes or other support structure of the fuel assembly.

A description of a PWR structure is particularly provided, however, it is understood that the invention is applicable to water reactors in general.

The thimble tubes typically receive control rods or instrumentation therein. Top and bottom nozzles are on opposite ends of the fuel assembly and are secured to the ends of the thimble tubes that extend slightly above and below the ends of the fuel rods.

The grids, as is known in the relevant art, are used to precisely maintain the spacing and support between the fuel rods in the reactor core, provide lateral support for the fuel rods, and induce mixing of the coolant. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in cells that are sized the same as those that receive fuel rods therein, or in relatively larger thimble cells defined in the interleaved straps. The interleaved straps provide attachment points to the thimble tubes, thus enabling positioning of the grids at spaced locations along the length of the fuel assembly.

The straps are configured such that the cells through which the fuel rods pass each include one or more relatively compliant springs and a plurality of relatively rigid dimples which cooperate to form the fuel rod support feature of the grid. Outer straps of the grid are attached together and peripherally enclose the inner straps of the grid to impart strength and rigidity to the grid and define individual fuel rod cells around the perimeter of the grid. The inner straps are typically welded or braised at each intersection and the inner straps are also welded or braised to the peripheral or outer straps defining the outer perimeter of the assembly.

At the individual cell level, the fuel rods support is normally provided by the combination of rigid support dimples and flexible springs as mentioned above. There are many variations to the spring-dimple support geometry that have been used or are currently in use, including diagonal springs, "I" shaped springs, cantilevered springs, horizontal and vertical dimples, etc. The number of springs per cell also varies. The typical arrangement is two springs and four dimples per cell. The geometry of the dimples and springs needs to be carefully determined to provide adequate rod support through the life of the assembly.

During irradiation, the initial spring force relaxes more or less rapidly, depending on the spring material and irradiation environment. The cladding diameter also changes as a result of the very high coolant pressure and operating temperatures and the fuel pellets inside the rod also change their diameter by densification and swelling. The outside cladding diameter also increases, due to the formation of an oxide layer. As a result of these dimensional and material property changes, maintaining adequate rod support through the life of the fuel assembly is very challenging.

Under the effect of axial flow and cross flow induced by thermal and pressure gradients within the reactor and other flow disturbances, such as standing waves and eddies, the fuel rods, which are slender bodies, are continuously vibrating with relatively small amplitudes. If the rod is not properly supported, this very small vibration amplitude may lead to relative motion between the support points and the cladding. If the pressure exerted by the sliding rod on the relatively small dimple and grid support surfaces is high enough, the small corrosion layer on the surface of the cladding can be removed by abrasion, exposing the base metal to the coolant. As a new corrosion layer is formed on the exposed fresh cladding surface, it is also removed by abrasion until ultimately the wall of the rod is perforated. This phenomenon is known as corrosion fretting and in 2006 it was the leading cause of fuel failures in PWR reactors.

Support grids also provide another important function in the fuel assembly, that of coolant mixing to decrease the maximum coolant temperature. Since the heat generated by each fuel rod is not uniform, there are thermal gradients in the coolant. One important parameter in the design of the fuel assemblies is to maintain the efficient heat transfer from the fuel rods to the coolant. The higher the amount of heat removed per unit time, the higher the power being generated. At high enough coolant temperatures, the rate of heat that can be removed per unit of cladding area in a given time decreases abruptly in a significant way. This phenomenon is known as deviation from nucleate boiling or DNB. If within the parameters of reactor operation, the coolant temperature would reach the point of DNB, the cladding surface temperature would increase rapidly in order to evacuate the heat generated inside the fuel rod and rapid cladding oxidation would lead to cladding failure. It is clear that DNB needs to be avoided to prevent fuel rod failures. Since DNB, if it occurs, takes place at the point where the coolant is at its maximum temperature, it follows that decreasing the maximum coolant temperature by coolant mixing within the assembly permits the generation of larger amounts of power without reaching DNB conditions. Normally, the improved mixing is achieved by using mixing vanes in the down flow side of the grid structure. The effectiveness of mixing is dependent upon the shape, size and location of the mixing vanes relative to the fuel rod.

Other important functions of the grid include the ability to sustain handling and normal operation at anticipated accident loads without losing function and to avoid "hot spots" on the fuel rods due to the formation of steam pockets between the fuel rods and the support points, which may result when not enough coolant is locally available to evacuate the heat generated in the fuel rod. Steam pockets cause overheating of the fuel rod to the point of failure by rapid localized corrosion of the cladding.

The grids, grid straps and integral flow mixers, e.g., mixing vanes, typically have been constructed of zirconium alloy because these materials exhibit low neutron adsorption cross-section and adequate mechanical and chemical properties. Similarly, fuel cladding materials also have been constructed of zirconium alloy. However, alternative fuel cladding materials are being considered for future nuclear reactor design and operation. Such new and different materials include silicon carbide (SiC) ceramic matrix composites which demonstrate properties that can provide for better safety margin and accident tolerance. However, the benefits of implementing new fuel cladding materials, such as SiC, can be offset because the grids, straps and/or mixing vanes inside the core contain a significant amount of zirconium. Thus, it is desirable to replace the zirconium-containing grids, straps and mixing vanes with other materials which have better structure stability, strength, and oxidation resistance at temperatures beyond normal operation and design basis accidents of a nuclear reactor.

It is thus desired to provide an improved material (e.g., containing little to no zirconium) that exhibits high temperature strength, corrosion resistance and accident tolerance for use in constructing grids for nuclear reactor fuel assemblies.

SUMMARY

The foregoing objectives are achieved employing a nuclear reactor fuel assembly having a parallel, spaced array of a plurality of elongated nuclear fuel rods supported between a lower nozzle and an upper nozzle and a plurality of spaced grids arranged in tandem along the axial length of the fuel rods between the upper nozzle and the lower nozzle. The plurality of spaced grids or portions or parts thereof are constructed of a composition including one or more ternary compounds of the general formula I:

$$M_{n+1}AX_n \tag{I}$$

wherein M is a transition metal, A is an element selected from the group A elements in the Chemical Periodic Table, X is selected from the group consisting of carbon and nitrogen, and n is an integer from 1 to 3.

In certain embodiments, M is selected from the group consisting of titanium, zirconium and niobium. Further, A can be selected from the group consisting of aluminum, silicon and tin.

In certain embodiments, the one or more ternary compounds of the general formula I are selected from the group consisting of $Ti_2AlC$, $Ti_3AlC_2$, $Ti_4AlN_3$, $Ti_2SiC$, $Ti_3SiC_2$, $Ti_3SnC_2$, $Zr_2AlC$, $Zr_2TiC$, $Zr_2SnC$, $Nb_2SnC$, $Nb_3SiC_2$, $(Zr_xNb_{1-x})_2AlC$ wherein x is greater than zero and less than 1.

The molar ratio of the M component to the A component to the X component of the one or more ternary compounds of the general formula I can be selected from the group consisting of 2:1:1, 3:1:2 and 4:1:3.

The ternary compounds of the general formula I can each have a density of greater than 85% of its theoretical density, and preferably greater than 95% of its theoretical density.

In certain embodiments, one or more of the plurality of spaced grids has a pattern stamped on the surface of the material.

Further, one or more of the plurality of spaced grids can include grid straps, integral flow mixers and combinations thereof.

The fuel assembly can be employed in a water reactor selected from the group consisting of a pressurized water reactor, boiling water reactor and heavy water reactor.

In another aspect, the invention provides a method of preparing an article selected from the group consisting of a support grid, a grid strap and an integral flow mixer for a nuclear reactor fuel assembly which includes obtaining in powder form a composition including one or more ternary compounds of the general formula I:

$$M_{n+1}AX_n \tag{I}$$

wherein M is a transition metal, A is an element selected from the group A elements in the Chemical Periodic Table, X is selected from the group consisting of carbon and nitrogen, and n is an integer from 1 to 3, and subjecting the composition to a process selected from the group consisting of uni-axial or isostatic hot pressing, additive manufacturing techniques, electric field assisted sintering and cold press followed by conventional sintering.

In certain embodiments, the article is prepared by obtaining a first powder composition including a ternary compound of the formula I and a second powder composition including a different second ternary compound of the formula I, depositing a first portion of the first powder composition onto a target area, scanning directed energy source which emits a beam over a surface of the target area, sintering a first layer of the first powder composition portion corresponding to a first cross-sectional region of the article, depositing a second portion of the second powder composition onto the first sintered layer, scanning the directed energy source over the first sintered layer, sintering a second layer of the second powder composition portion corresponding to a second cross-sectional region of the article, joining the first and second layers during the sintering of the second layer, and depositing successive alternating portions of the first and second powder compositions onto the previous sintered layers and sintering each successive portion to produce successive sintered layers joined at a previous sintered layer and the article including a plurality of sintered layers.

The method can further include employing a three-dimensional CAD file which is mathematically sliced into two-dimensional cross-sections.

In certain embodiments, the article includes one or more grid straps which are joined together by a process selected from the group consisting of welding, brazing and fusing. The fusing can be conducted using a laser or an electron beam and materials for brazing are selected from the group consisting of copper, copper-zinc, copper-zinc-nickel, nickel-chromium-phosphorus, nickel-silver, and silver alloy.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The invention relates to sintered ternary compounds for use in constructing articles, such as grids or portions or parts of the grids, such as grid straps and integral flow mixers, for nuclear reactor fuel assemblies. Historically, grids, grid straps and integral flow mixers are constructed of zirconium and/or zirconium alloy. It is an object of this invention to replace these conventional materials with compositions including one or more sintered ternary compounds having one or more properties of improved structure stability, strength, and oxidation resistance at temperatures which exceed normal operation. It is contemplated that the compositions in accordance with the invention are substantially composed of the one or more ternary compounds, however, the compositions may include material(s) other than the one or more ternary compounds.

For ease of description, the disclosure provided herein is directed to a pressurized nuclear reactor (PWR) design, however, it is understood that the invention is equally applicable to various water reactor designs including boiling water reactors (BWRs) and heavy water reactors (HWRs).

When Loss of Coolant Accidents (LOCAs) occur the fuel cladding temperature can be as high as 2200° F., and the temperature of the grids, grid straps and integral flow mixers which are in contact with the fuel rods can be the same high temperature. For beyond design basis accidents, the cladding and grid temperature may be well beyond 2200° F. for an extended period of time. It has been shown that grids, grid straps and integral flow mixers made of conventional material, such as zirconium alloy, may have "run-away" oxidation when exposed to steam at temperatures at or above 2200° F. and as a result, lose strength and structure integrity, and produce hydrogen gas. Failures of grids, grid straps and integral flow mixers may lead to more significant consequences such as loss of coolable geometry or even core meltdown.

It is thus, an objective of the invention to develop articles, such as grids, grid straps and integral flow mixers, e.g., mixing vanes, for nuclear reactor fuel assemblies which are constructed of ternary compound-containing compositions which demonstrate excellent oxidation resistance and can avoid "run-away" oxidation at LOCA temperatures.

Figure 1A:
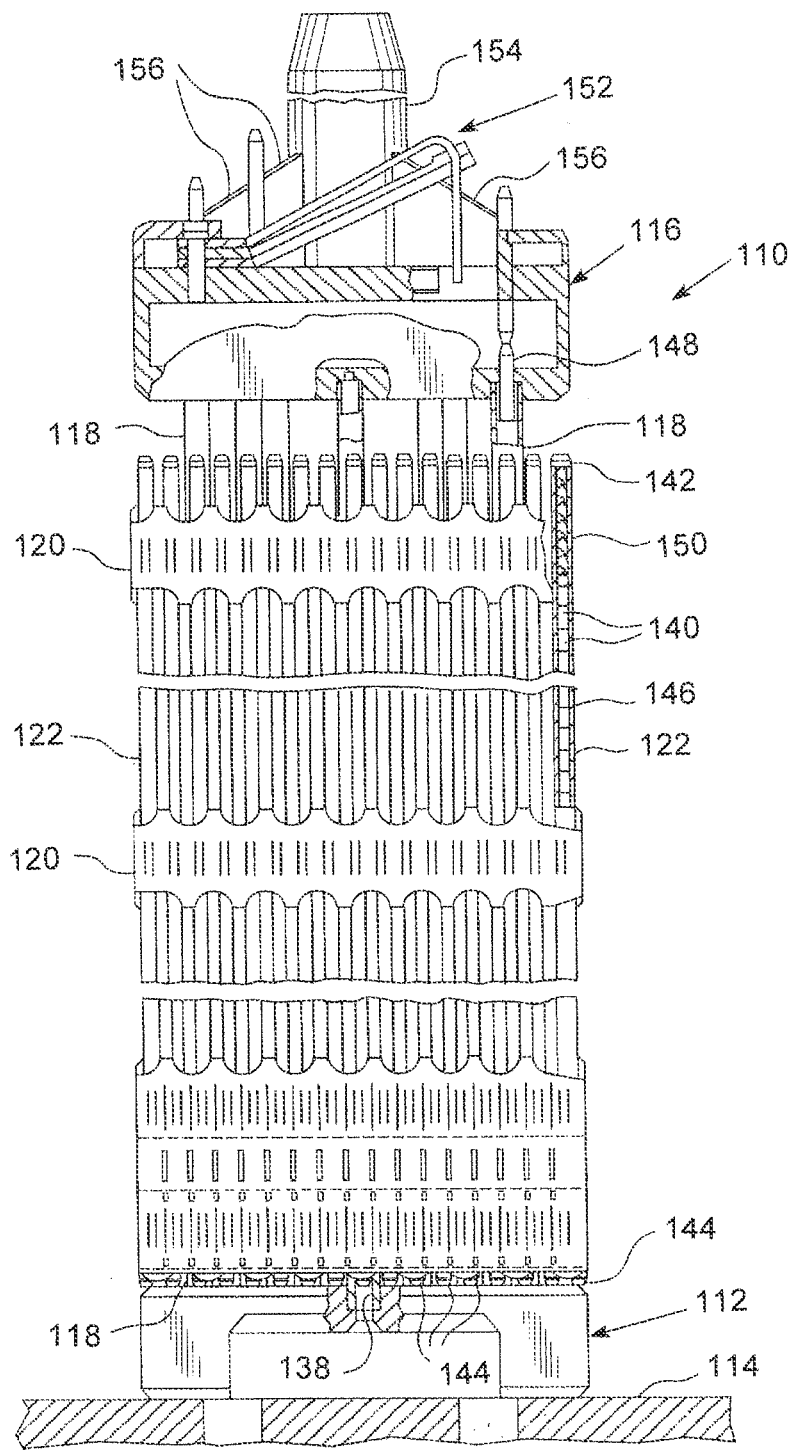
FIG. 1A is an elevational view, partially in section, of a fuel assembly illustrated in vertically shortened form, with parts broken away for clarity.

FIG. 1A is an elevational view, represented in vertically shortened form, of a fuel assembly being generally designated by reference character 110. The fuel assembly 110 is the type used in a pressurized water reactor and has a structural skeleton which, at its lower end includes a bottom nozzle 112. The bottom nozzle 112 supports the fuel assembly 110 on a lower core plate 114 in a core region of the nuclear reactor. In addition to the bottom nozzle 112, the structural skeleton of the fuel assembly 110 also includes a top nozzle 116 at its upper end and a number of guide tubes or thimbles 118 which align with guide tubes in the upper internals of the reactor. The guide tubes or thimbles 118 extend longitudinally between the bottom and top nozzles 112 and 116 and at opposite ends are rigidly attached thereto.

Figure 2:
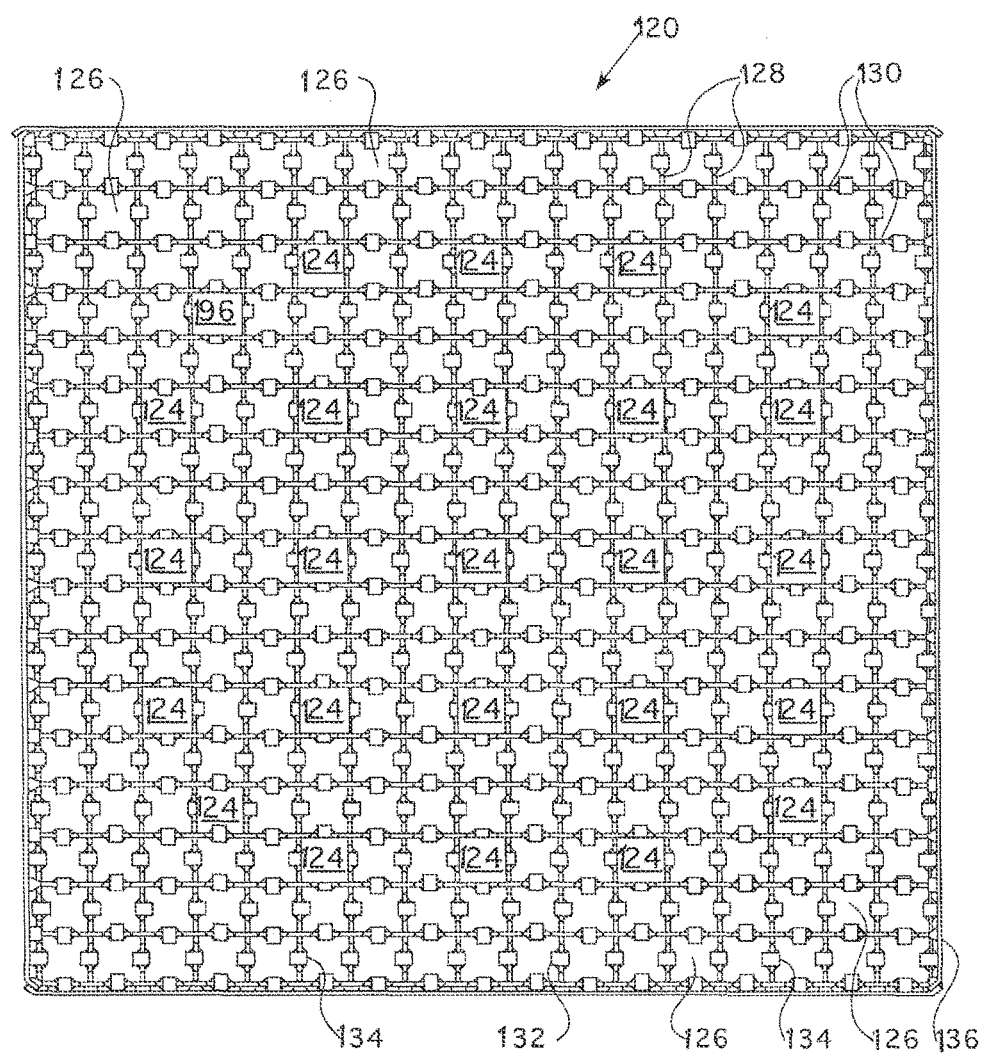
FIG. 2 is a plan view of a conventional egg-crate support grid for application to a traditional PWR fuel assembly shown in FIG. 1A.

The fuel assembly 110 further includes a plurality of transverse grids 120 axially spaced along and mounted to the guide thimbles 118 and an organized array of elongated fuel rods 122 transversely spaced and supported by the grids 120. A plan view of a conventional grid 120 without the guide thimbles 118 and fuel rods 122 is shown in FIG. 2. The guide thimbles 118 pass through the cells labeled 124 and the fuel rods 122 occupy the remaining cells 126 except for the center cell which is reserved for an instrument thimble 138 (shown in FIG. 1A). As can be seen from FIG. 2, the grids 120 are conventionally formed from an array of orthogonal straps 128 and 130 that are interleaved in an egg-crate pattern with the adjacent interface of four straps defining approximately square support cells through which the fuel rods 122 are supported in the cells 126 in transverse, spaced relationship with each other. In many designs, springs 132 and dimples 134 are stamped into opposite walls of the straps 128 and 130 that form the support cells 126. The springs and dimples extend radially into the support cells and capture the fuel rods 122 therebetween; exerting pressure on the fuel rod cladding to hold the rods in position. The orthogonal array of straps 128 and 130 is welded at each strap end to a bordering strap 136 to complete the grid structure 120. In the prior art embodiment shown in FIG. 2, the bordering strap 136 is formed from four separate straps welded together at the corners. Also, as previously mentioned the assembly 110, as shown in FIG. 1A, has an instrumentation tube 138 located in the center thereof that extends between and is captured by the bottom and top nozzles 112 and 116. With such an arrangement of parts, fuel assembly 110 forms and integral unit capable of being conveniently handled without damaging the assembly of parts.

As mentioned above, the fuel rods 122 in the array thereof in the assembly 110 are held in spaced relationship with one another by the grids 120 spaced along the fuel assembly length. As shown in FIG. 1A each fuel rod 122 includes the plurality of nuclear fuel pellets 140 and is closed at its opposite ends by upper and lower end plugs 142 and 144. Commonly, a plenum spring 150 is disposed between the upper end plug 142 and the pellets 140 to maintain the pellets in a tight stacked relationship within the rod 122. The fuel pellets 140, composed of fissile material, are responsible for creating the reactive power of the nuclear reactor. A liquid moderator/coolant, such as water or water containing boron and other coolant additives, is pumped upwardly through the fuel assemblies of the core in order to extract heat generated therein for the production of useful work. The cladding 146 which surrounds the pellets 140 functions as a barrier to prevent the fission byproducts from entering the coolant and further contaminating the reactor system.

To control the fission process, a number of control rods 148 are reciprocally moveable in the guide thimbles 118 located at predetermined positions in the fuel assembly 110. The guide thimble cell locations 124 can be specifically seen in FIG. 2, except for the center location which is occupied by the instrumentation tube 138. Specifically, a rod cluster control mechanism 152, positioned above the top nozzle 116, supports a plurality of the control rods 148. The control mechanism has an internally threaded cylindrical hub member 154 with a plurality of radially extending flukes or arms 156 that form a configuration commonly known as a spider. Each arm 156 is interconnected to a control rod 148 such that the control rod mechanism 152 is operable to move the control rods vertically in the guide thimbles 118 to thereby control the fission process in the fuel assembly 110, under the motive power of a control rod drive shaft which is coupled to the control rod hub 154, all in a well known manner.

Figure 1B:
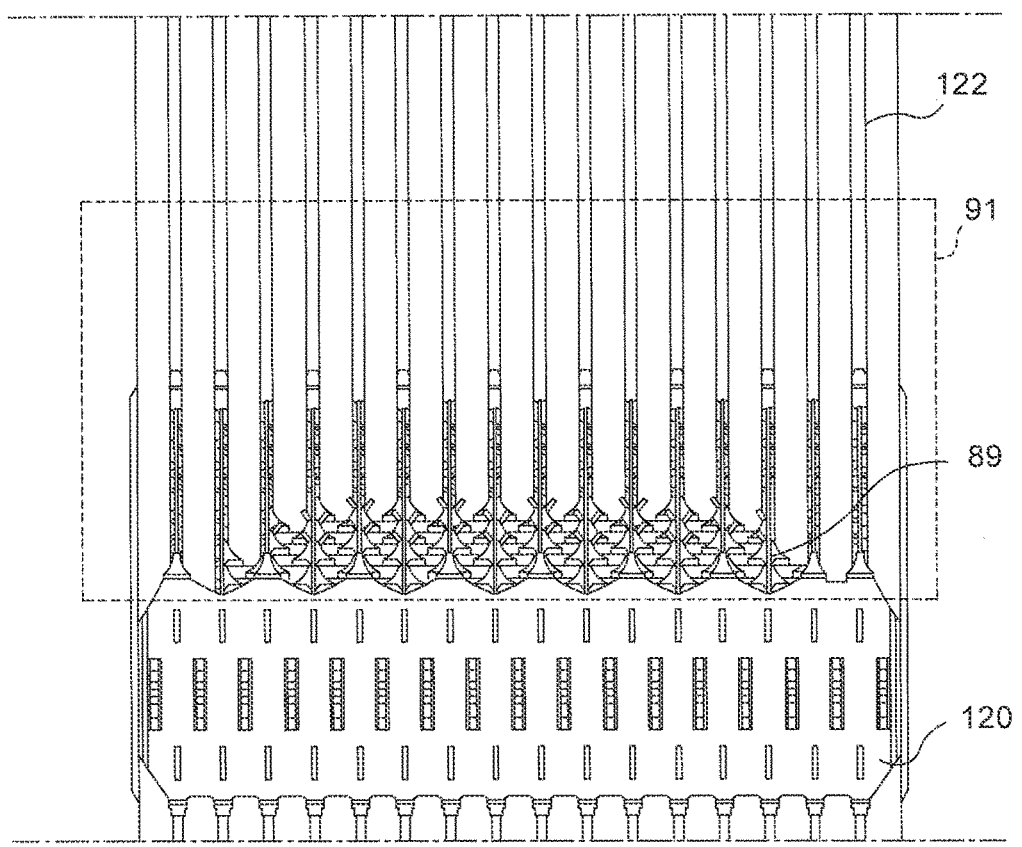
FIG. 1B is a detailed view of a portion of the fuel assembly shown in FIG. 1A.

FIG. 1B shows a portion of the fuel assembly 110 in FIG. 1A wherein the fuel rods 122 are held in spaced relationship with one another by the grids 120. As shown in FIG. 1B, mixing vanes 89 are installed on an upper surface of one of the plurality of grids 120. The mixing vanes 89 create turbulence, for example, in the region 91.

Various designs of support grids, spacers and mixers are known in the art. The invention is not limited by these particular designs and therefore, the invention is equally applicable to the various designs. For example, an alternative support grid design is illustrated in FIGS. 3 through 17.

Figure 3:
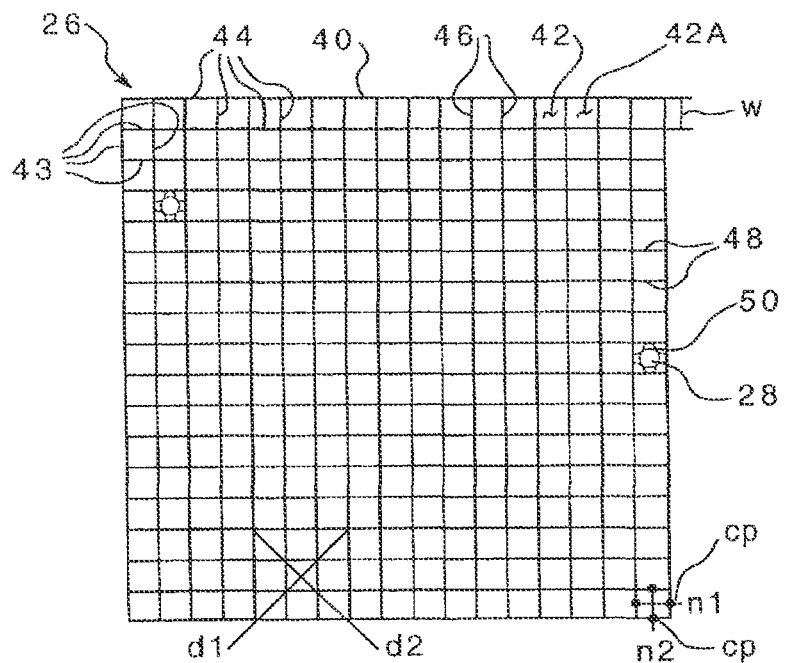
FIG. 3 is a top view of another frame assembly showing the "vertical" and "horizontal" straps.
Figure 4:
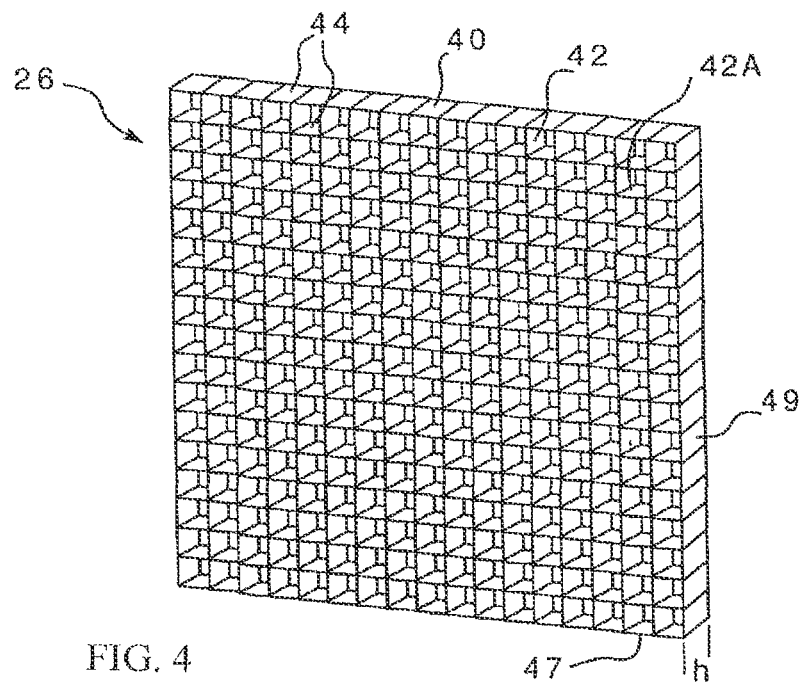
FIG. 4 is an isometric view of the frame assembly shown in FIG. 3.
Figure 5:
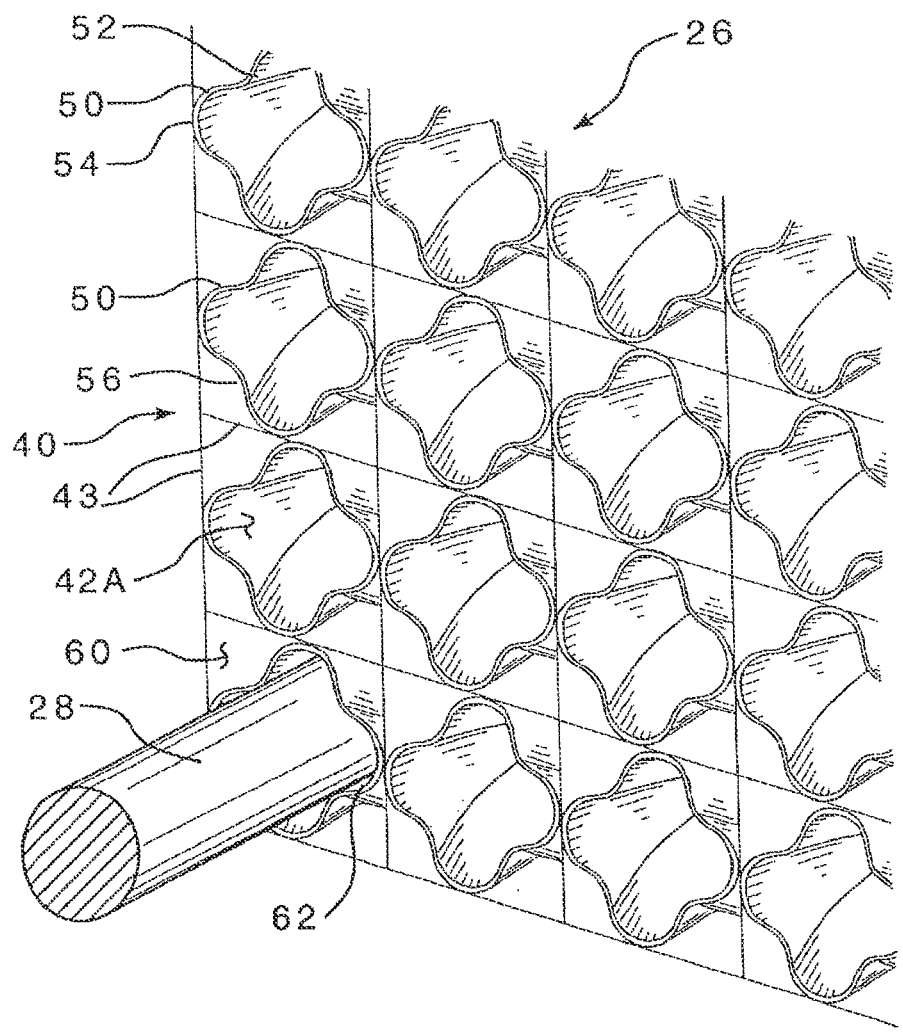
FIG. 5 is a detailed view of a support grid of a frame assembly shown in FIG. 3.

As shown in FIGS. 3 and 5, the support grid 26 includes a frame assembly 40 and at least one generally cylindrical tubular member 50. The frame assembly 40 includes a plurality of cells 42 defined by cell walls 43. Each cell 42 has a width as indicated by the letter "w". In one embodiment, the cells 42 and cell walls 43 are formed from a plurality of substantially flat, elongated strap members 44 disposed in two interlocked sets, a vertical set 46 and a horizontal set 48. The strap members 44 in the vertical and horizontal sets 48 of strap members 44 are generally perpendicular to each other. Additionally, the strap members 44 in each set are generally evenly spaced. In this configuration, the strap members 44 form generally squire cells 42A. Thus, each cell 42A has two diagonal axes "d1" and "d2," which are perpendicular to each other and extend through the corners of the cell 42A, as well as two normal axes "n1" and "n2," which are perpendicular to each other and extend through the center of the cell 42A and which intersect perpendicularly with the cell walls 43. The points on the cell wall 43 that the two normal axes pass through are the closest point, "cp", between the cell wall 43 and the center of the cell 42. As shown in FIG. 4, the frame assembly 40 also has a height, indicated by the letter "h", wherein the height is substantially less that the width or length of the frame assembly 40. Further, the frame assembly 40 has a top side 47 and a bottom side 49. It is notable that the strap members 44 of the present invention do not include protuberances, such as springs and dimples. The lack of additional support structures makes the construction of the frame assembly 40 very easy.

Figure 6:
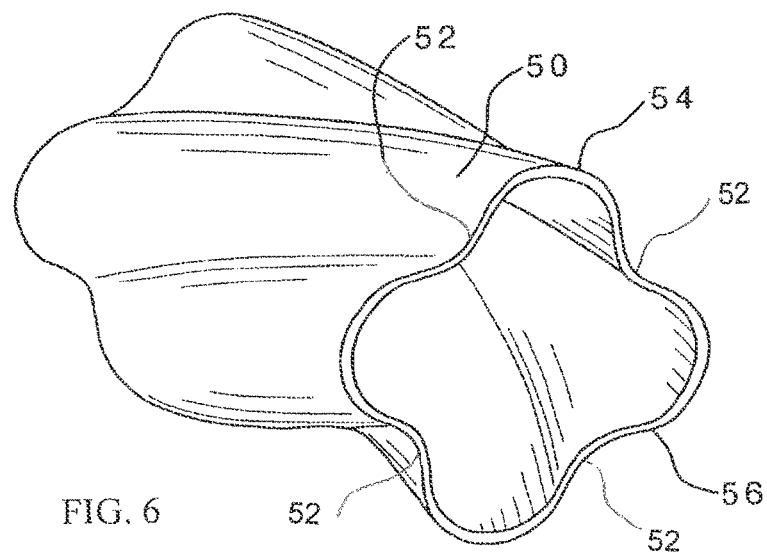
FIG. 6 is an isometric view of a tubular element with four fuel rod contact portions.
Figure 7:
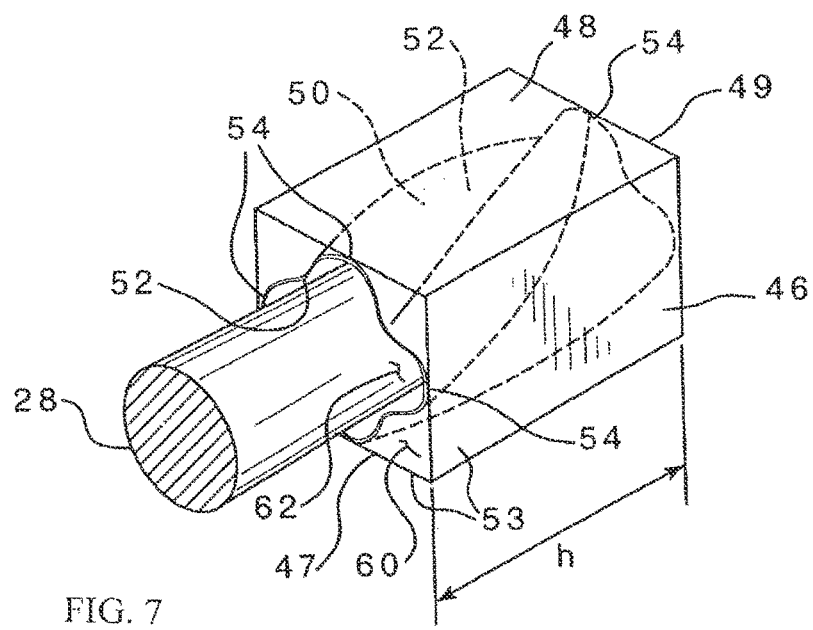
FIG. 7 is an isometric view of a tubular element with four fuel rod contact portions disposed in a cell with a fuel rod.

The tubular member 50 of the support grid 26 is shown in FIGS. 5 and 6. The tubular member 50 includes at least one helical fluted portion or fuel rod contact portion 52, a cell contact portion 54, and a transition portion 56 disposed therebetween. As shown in FIGS. 5-7, the tubular member 50 has four fuel rod contact portions 52, which is the preferred embodiment. Other configurations are discussed below. The cell contact portion 54 has a greater diameter being generally equivalent to said cell width and is structured to snugly engage the cell 46. The fuel rod contact portion 52 has a lesser diameter, being generally equivalent to said fuel rod 28 diameter. Thus, the tubular member 50 may be disposed in a cell 42 and a fuel rod 28 may be disposed in the tubular member 50. In a preferred embodiment, the tubular member 50 is made from a material having a uniform thickness. Thus, the helical fuel rod contact portion 52 defines an outer passage 60 between the outer side of the tubular member 50 and the cell wall 43. Additionally, the cell contact portion 54, which is spaced from the fuel rod 28, defines an inner passage 62. Water which flows through either the outer or inner passages 60, 62 is influenced by the shape of the helical fuel rod contact portion 52 resulting in the water being mixed.

Figure 8:
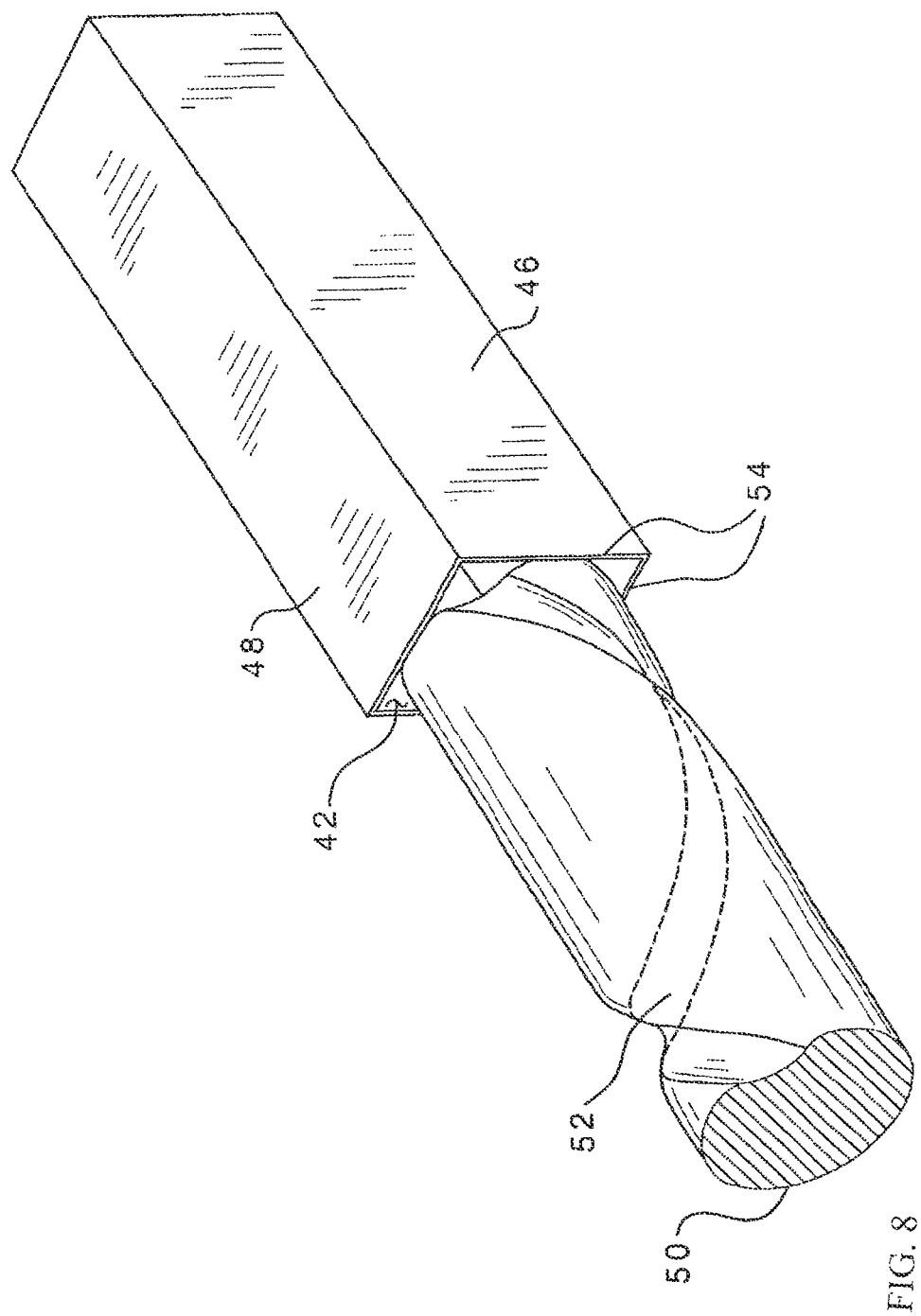
FIG. 8 is an isometric view of a tubular element with a single contact portion adjacent to a cell.
Figure 9:
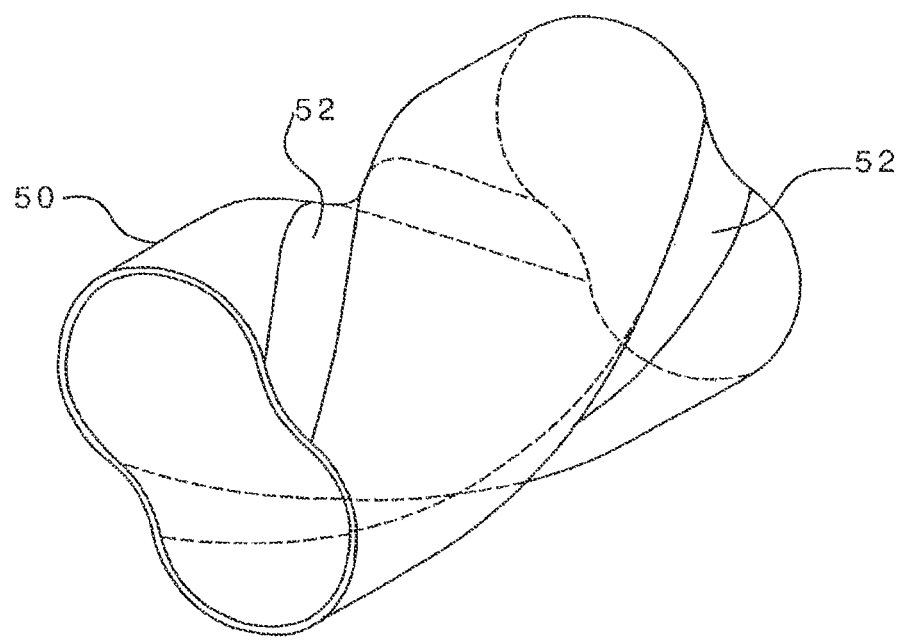
FIG. 9 is an isometric view of a tubular element with two fuel rod contact portions.
Figure 10:
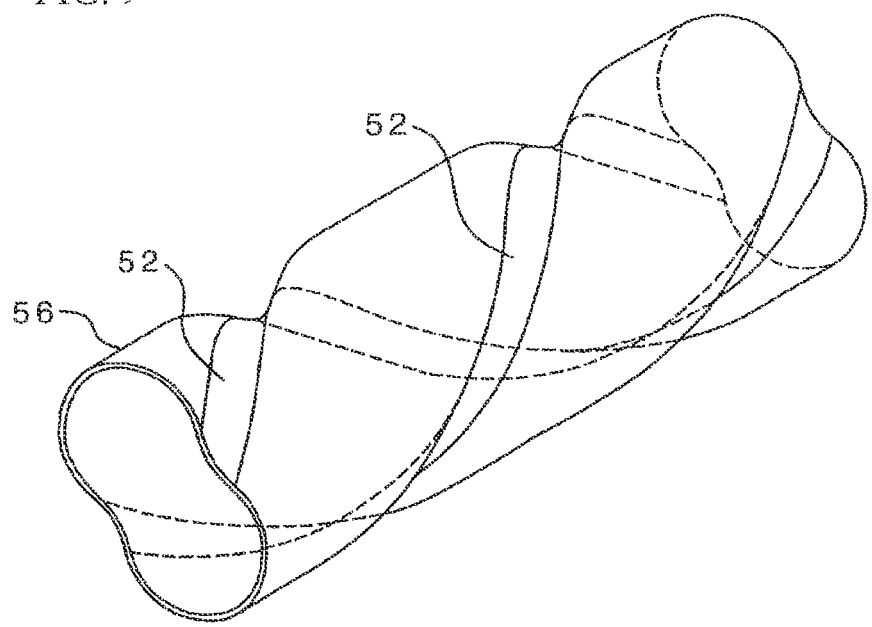
FIG. 10 is an alternate isometric view of a tubular element with two fuel rod contact portions.

The tubular member 50 may be constructed with any number of helical fuel rod contact portions 52 which may have any degree of pitch. For example, as shown in FIG. 8, a tubular member 50 has a single helical fuel rod contact portion 52 that extends 360 degrees about the tubular member 50. As shown in FIG. 9, a tubular member 50 has a two helical fuel rod contact portions 52 that each extend 180 degrees about the tubular member 50. As shown in FIG. 10, a tubular member 50 has a two helical fuel rod contact portions 52 that each extend 360 degrees about the tubular member 50. As noted above, FIG. 6 shows a tubular member 50 having a four helical fuel rod contact portions 52 that each extend 90 degrees about the tubular member 50. Preferably, the helical fuel rod contact portions 52 are spaced evenly about the tubular member 50, but this is not required.

These examples have used a number (N) of helical fuel rod contact portions 52 and an angular displacement (A) that equals 360 degrees or a multiple of 360 degrees. This configuration is especially adapted for use in a square cell 42A. That is, the cell contact portion 54 will only contact the cell wall 43 at the closest point on the cell wall 43. At other points, e.g., the corner of the cell 42A, the tubular member 50 greater diameter, that is the cell contact portion 54, will not contact a cell wall 43. Thus, as shown best in FIG. 7, where there are four evenly spaced, helical fuel rod contact portions 52 that each extend 90 degrees about the tubular member 50, there are four corresponding cell contact portions 54, each disposed between a helical fuel rod contact portions 52. To ensure the greatest amount of surface area contact between the tubular member 50 and the cell wall 43, the tubular member 50 is disposed with each helical fuel rod contact portion 52 generally aligned with a diagonal axis at the top side 47 of the cell and aligned with a different diagonal axis at the bottom side 49 of the cell. In this orientation, the cell contact portion 54 is aligned with a cell wall 43 closest point at the top side 47 and at the bottom side 49. A similar configuration may be made with cells 42 of any shape. That is, the number (N) of helical fuel rod contact portions 52 is preferably equal to the number of sides (S) to the cell 42, and the angular displacement (A) is preferably 360 degrees/S. Thus, the tubular member may be positioned with each helical fuel rod contact portion 52 generally aligned with an axis passing through the corner of the cell 42 at the top side 47 of the cell and aligned with a different axis passing through the corner of the cell 42 at the bottom side 49 of the cell. Thus, the cell contact portion 54 is aligned with the cell wall 43 closest point at the top side 47 and at the bottom side 49.

Figure 11:
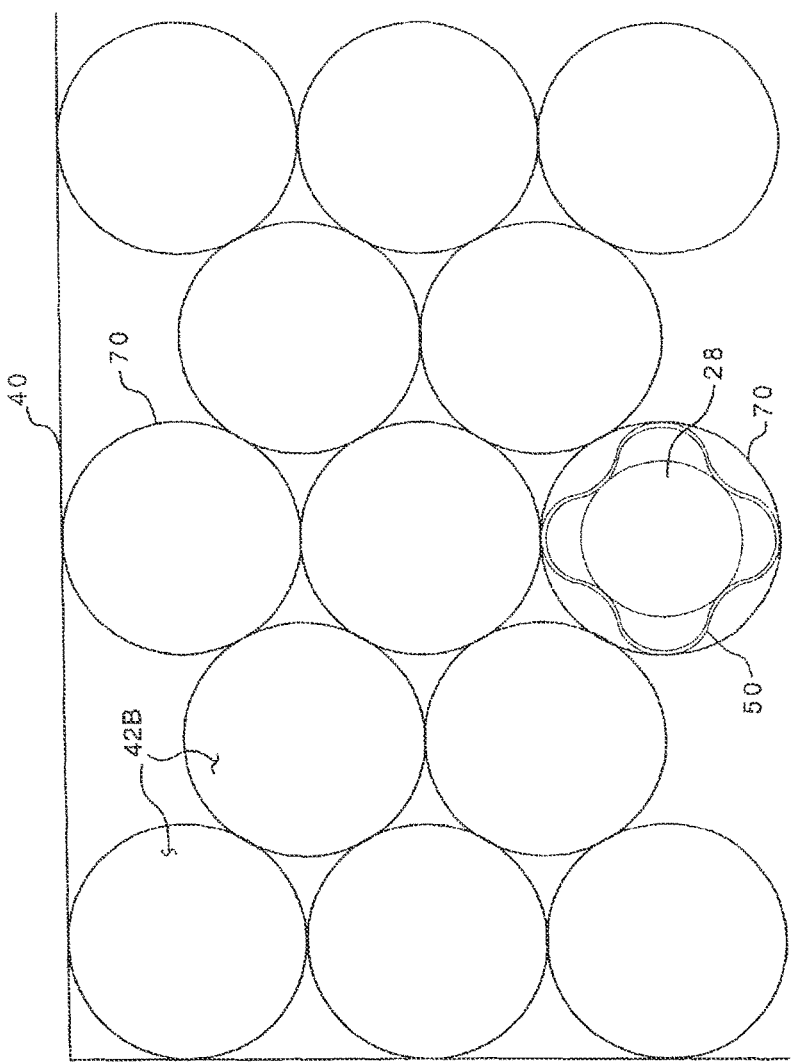
FIG. 11 is a top view of a portion of a frame assembly made from tubular frame members.
Figure 12:
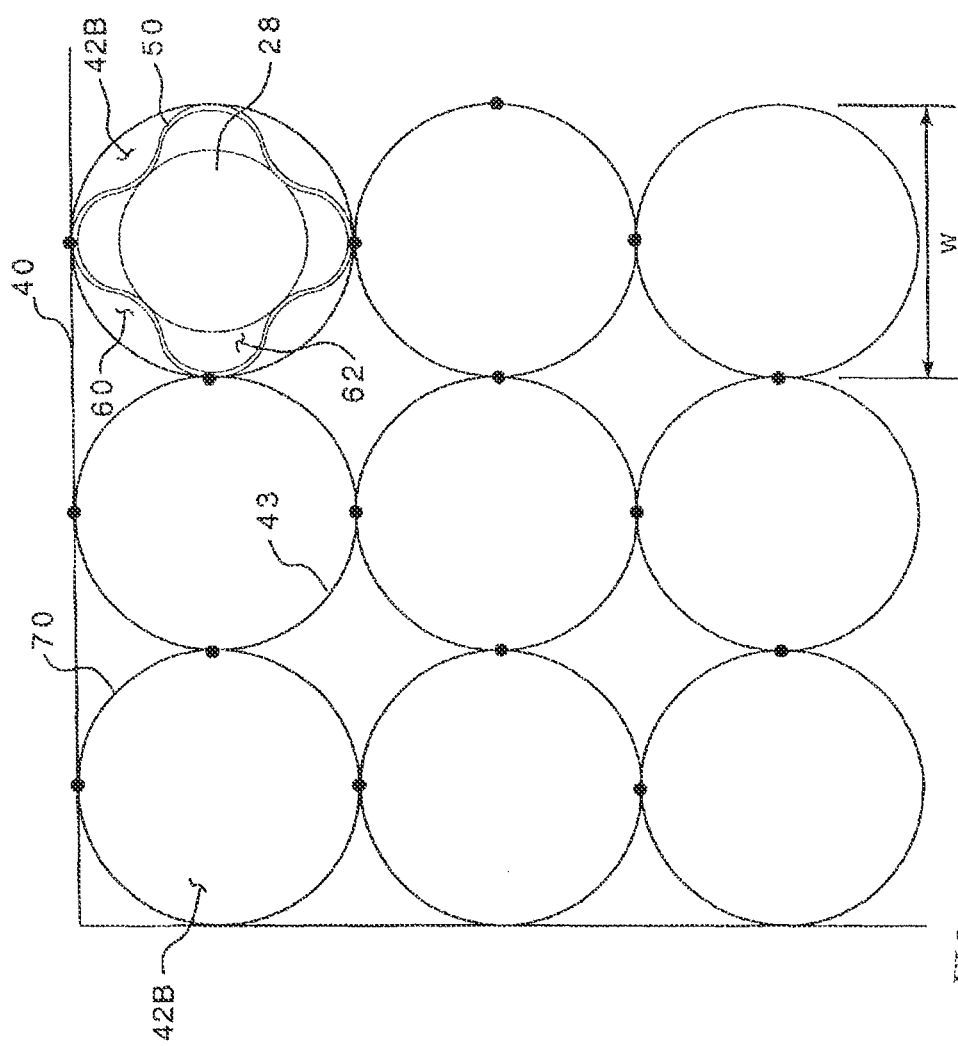
FIG. 12 is a top view of a portion of a frame assembly made from aligned tubular frame members.
Figure 13:
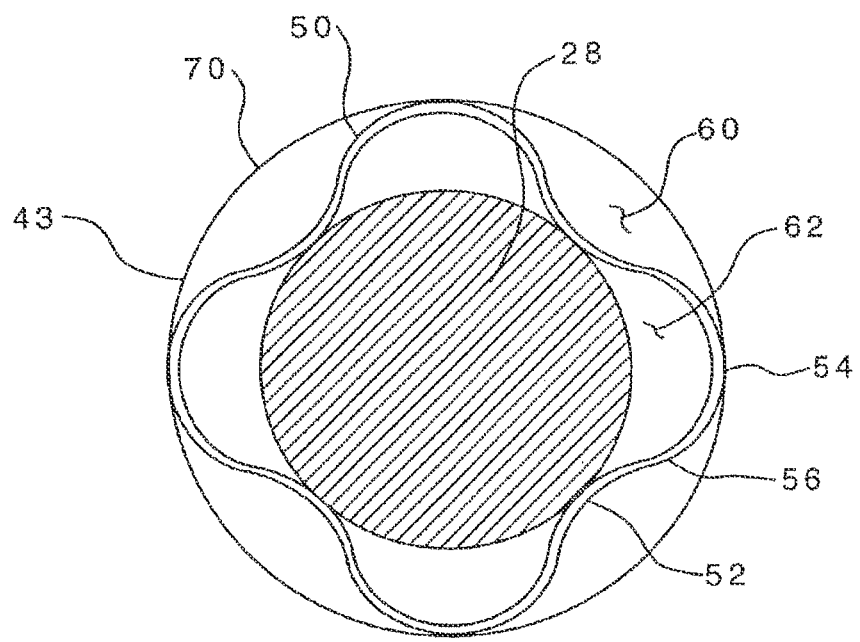
FIG. 13 is a detailed top view of a tubular member in a tubular frame member.

In another embodiment, the frame assembly 40 includes a plurality of cylindrical cells 42B defined by a plurality of connected tubular frame members 70. As shown in FIG. 11, the frame assembly 40 may have a plurality of densely packed tubular frame members 70, however, as shown in FIG. 12, a pattern of aligned tubular frame members 70 is preferred. That is, the tubular frame members 70 are coupled to each other at 90 degree intervals about the perimeter of each tubular frame member 70. The tubular member 50 is disposed within the cylindrical cells 42B. As shown in FIG. 13, the combination of the tubular member 50 and the cylindrical cell 42B again creates an inner passage 62 between the fuel rod 28 and the tubular member 50 and an outer passage 60 between the tubular member 50 and the tubular frame member 70. The cylindrical cell 42B of the tubular frame member 70 has the additional advantage that the entire cell contact portion 54 abuts the cell wall 43. That is, the diameter of the cylindrical cell 42B is the same as the cell width, which is also the same as the closest point, and, as such, the cell contact portion 54 will engage the cell wall 43 along the entire height of the cell wall 43. This is unlike a square cell 42A wherein the cell contact portion 54 does not contact the cell wall 43 at the corners.

Figure 14:
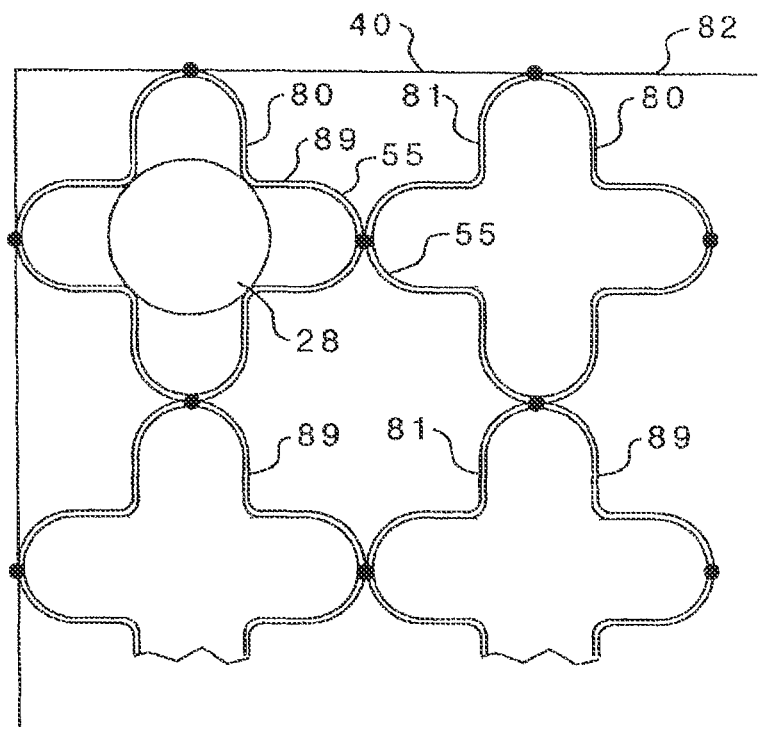
FIG. 14 is a detailed top view of a frame assembly made from helical frame members.

In another embodiment, shown in FIG. 14, the functions of the tubular member 50 and the tubular frame member 70 have been combined in a helical frame member 80. That is, the frame assembly 40 includes a plurality of helical frame members 81 disposed in a matrix pattern. The helical frame member 80, like the tubular member 50, includes at least one helical fuel rod contact portion 52, however, instead of a cell contact portion 54, the outer side of the helical frame member 80 is a contact portion 55 structured to be directly coupled to the contact portion 55 of an adjacent helical frame member 80. As with the tubular frame member 70 embodiment of the frame assembly 40, the helical frame members 80 are coupled to each other at 90 degree intervals about the perimeter of each helical frame member 80. Additionally, in this embodiment the frame assembly 40 preferably includes a plurality of outer straps 82 structured to extend about the perimeter of the plurality of helical frame members 81. The outer straps 82 are coupled to the contact portion 55 of the helical frame members 80 disposed at the outer edge of the plurality of helical frame members 81. A fuel rod 28 is disposed through at least one helical frame member 80.

Figure 15:
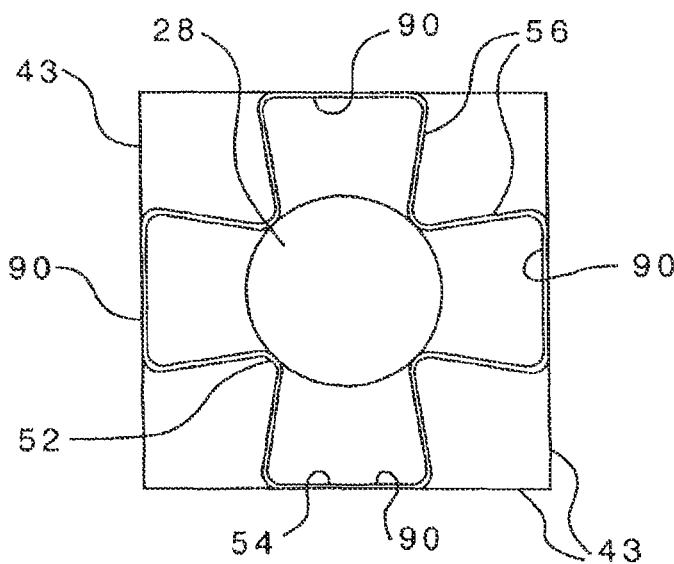
FIG. 15 is a detailed top view of a tubular member having platforms at the cell contact portions.
Figure 16:
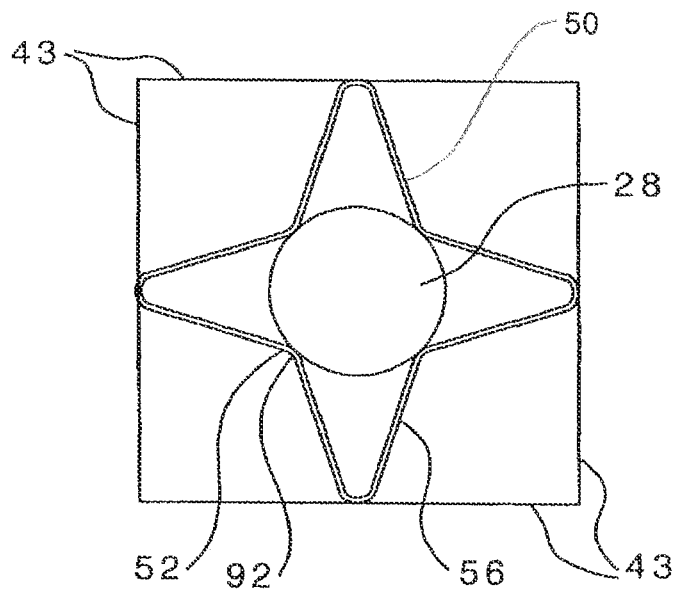
FIG. 16 is a detailed top view of a tubular member having platforms at the fuel rod contact portions.
Figure 17:
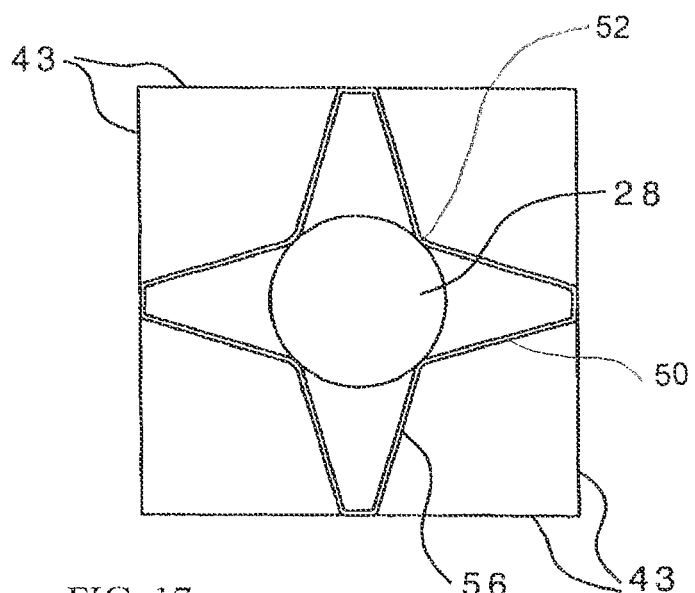
FIG. 17 is a detailed top view of a tubular member having platforms at the cell contact portion and the fuel rod contact portions, and with a flat transition portion.

As shown best in FIG. 13, as viewed as a cross-section, the tubular member 50 components, i.e., the helical fuel rod contact portion 52, the cell contact portion 54, and the transition portion 56, preferably, are shaped as smooth curves. This configuration gives the tubular member 50 a compressible, spring-like quality. However, as shown in FIG. 15, the cell contact portion 54 may include an extended planar length or platform 90. The platform 90 is structured to provide a greater surface area which engages the cell wall 43. The greater length of the platform 90 will necessitate the transition portion 56 having a sharp curve. Similarly, as shown in FIG. 16, the helical fuel rod contact portion 52 may include a concave platform 92 adapted to extend radially about the fuel rod 28. As before, greater length of the concave platform 92 will necessitate the transition portion 56 having a sharp curve. A tubular member 50 may also include both a platform 90 at the cell contact portion 54 and a concave platform 92 at the helical fuel rod contact portion 52. Finally, the tubular member 50 may also be constructed with a generally flat transition portion 56 with angled ends 94. As shown in FIG. 17, in this embodiment the transition portion 56 is generally planar in a cross-sectional top view. It is understood that, due to the helical nature of the fuel rod contact portion 52, the transition portion 56 is not flat in the direction of the height of the frame assembly 40.

The compositions of the invention include one or more ternary compounds of the general formula I:

$$M_{n+1}AX_n \qquad (I)$$

wherein M is a transition metal, A is an element selected from the group A elements in the Chemical Periodic Table, X is carbon (C) or nitrogen (N), and n is an integer from 1 to 3. These ternary compounds are referred to as MAX phase compounds. In certain embodiments, M includes titanium (Ti), zirconium (Zr), niobium (Nb) and, mixtures and combinations thereof. Further, in certain embodiments, A includes aluminum (Al), silicon (Si), tin (Sn) and, mixtures and combinations thereof. Thus, in certain embodiments, the ternary compounds in accordance with the invention include $Ti_2AlC$, $Ti_3AlC_2$, $Ti_4AlN_3$, $Ti_2SiC$, $Ti_3SiC_2$, $Ti_3SnC_2$, $Zr_2AlC$, $Zr_2TiC$, $Zr_2SnC$, $Nb_2SnC$, $Nb_3SiC_2$, $(Zr_xNb_{1-x})_2AlC$ wherein x is greater than zero and less than 1 and, mixtures and combinations thereof.

Suitable compounds of the general formula I for use in the invention have a density of greater than 85% of their theoretical density, and preferably a density of greater than 95% of their theoretical density. Furthermore, in certain embodiments the stoichiometry of the ternary compounds is such that the molar ratio of the M component to the A component to the X component (M:A:X) is 2:1:1 or 2:1:2 or 4:1:3. That is, n equals 1, 2 or 3.

In certain embodiments, the compositions of the invention can include carbide (wherein X is carbon), nitride (wherein X is nitrogen) or a mixture or combination of carbide and nitride (wherein X is a mixture of combination of carbon and nitrogen).

The ternary compounds according to general formula I exhibit material strength (e.g., Young's modules) similar to the material strength of zirconium alloys and they can maintain the strength at elevated temperatures. For example, the yield strength of $Ti_2AlC$ is about 700 MPa, which is about half of the yield strength of Inconel 718 but twice the yield strength of typical zirconium alloys with 1% Sn and 0.7% Nb. Further, suitable ternary compounds according to the invention demonstrate at least one of the following properties: adequate ductility, elasticity and low neutron adsorption cross-section. In addition, use of the ternary compounds according to the invention result in less hydrogen being produced and therefore, the ternary compounds and the articles constructed therefrom are not as susceptible to hydrogen induced embrittlement as is zirconium alloy. Furthermore, it is contemplated that the maximum strain or elongation of the ternary compounds is increased due to the presence of elements M and A in general formula I, which form intermetallics in the matrix.

In a nuclear reactor core, a combination of cladding which is constructed of SiC and articles, e.g., grids, grid straps and integral flow mixers, which are constructed of MAX phase compounds allows at least substantial, and in some instances complete, removal of zirconium from of the core thereby further increasing the accident tolerance of the nuclear fuel.

Articles for nuclear reactor fuel assemblies, such as grids, grid straps and mixing vanes, constructed of ternary compound-containing compositions in accordance with the invention can be manufactured using conventional techniques known in the art. Non-limiting examples of such techniques include uniaxial or isostatic hot pressing, additive manufacturing techniques, electric field assisted sintering and cold press followed by conventional sintering.

In certain embodiments, for example, the articles can be made using conventional pressure-less sintering employing an apparatus including a laser or other directed energy source which is selectable for emitting a beam in a target area, a powder dispenser system for depositing powder into the target area and, a laser control mechanism to move the aim of the laser beam and modulate the laser to selectively sinter a layer of powder dispensed into the target area. The control mechanism operates to selectively sinter only the powder disposed within defined boundaries to produce the desired layer of the article. The control mechanism operates the laser to selectively sinter sequential layers of powder, producing a completed article including a plurality of layers sintered together.

The ternary compound(s) can be powdered in a conventional manner, for example, by mechanical crushing.

Preferably, the control mechanism includes a computer, e.g., a CAD/CAM system, to determine the defined boundaries for each layer. That is, given the overall dimensions and configuration of the article, e.g., grid, grid strap or integral flow mixer, the computer determines the defined boundaries for each layer and operates the laser control mechanism in accordance with the defined boundaries. Alternatively, the computer can be initially programmed with the defined boundaries of each layer. Sintering apparatus and methods are generally known in the art. A suitable apparatus and method for use in the invention is disclosed in U.S. Pat. No. 4,863,538, which is incorporated herein by reference in its entirety.

In accordance with certain embodiments of the invention, one or more ternary compounds of the general formula I is used (e.g., layered) in a sintering process to produce an article, e.g., grid, grid strap or integral flow mixer. The one or more ternary compounds are in the form of a powder and deposited into the target area as above-described. The process is controlled such that the laser selectively sinters a layer consisting of a first ternary compound powder (of the general formula I) and the laser then selectively sinters sequential layers of powder, producing a completed article comprising a plurality of layers sintered together. Each of the sequential layers can include the first ternary compound powder or alternatively, each of the sequential layers can include alternating layers of a first ternary compound powder and a different second ternary compound powder (of the general formula I).

Additional materials or powders can be mixed or combined with the one or more ternary compounds to form compositions in accordance with the invention.

In one embodiment, a grid can be made by the use of laser or electron beams for sintering wherein the process is initiated with a 3D CAD file which is mathematically sliced into 2D cross-sections and the grid is built a layer at a time until completed. Thus, the grid can be the build-up of a layer-by-layer process. That is, the grid can be considered a plurality of discrete cross-sectional regions which cumulatively conclude the three-dimensional configuration of the grid. Each discrete cross-sectional region has defined two-dimensional boundaries.

Figure 18:
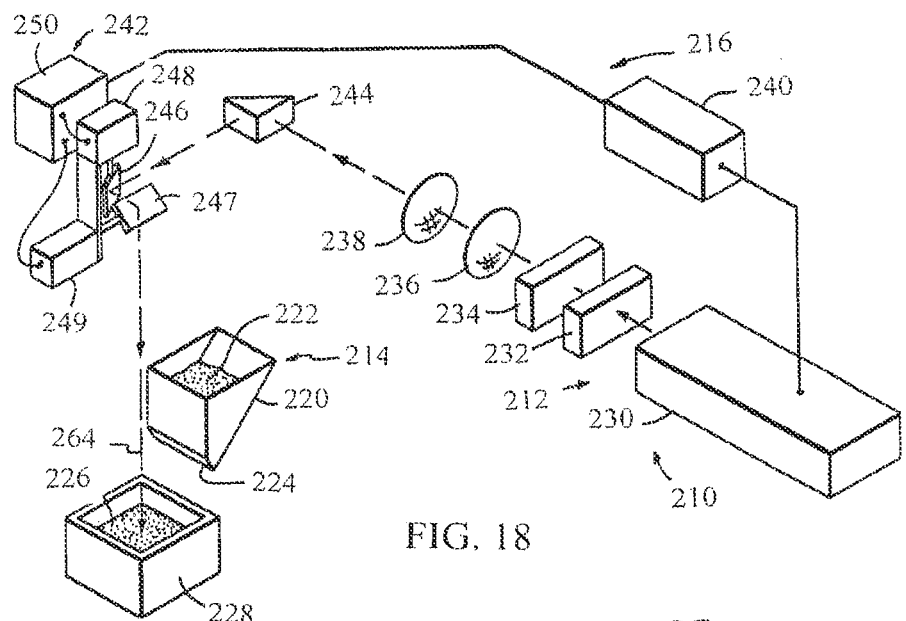
FIG. 18 is a schematic representation of a sintering apparatus known in the prior art.

FIG. 18 broadly illustrates a sintering apparatus 210 which includes a laser 212, powder dispenser 214, and laser control means 216. In more detail, the powder dispenser 214 includes a hopper 220 for receiving the powder 222 and having an outlet 224. The outlet 224 is oriented for dispensing the powder to a target area 226, which in FIG. 18 is generally defined by the confinement structure 228. It is contemplated and understood that many alternatives exist for dispensing the powder 222. In accordance with the invention, powder 222 includes a combination of one, two or more carbides and/or nitrides of the general formula I.

The components of the laser 212 are shown somewhat schematically in FIG. 18 and include a laser head 230, a safety shutter 232, and a front mirror assembly 234. The type of laser used is dependent upon many factors, and in particular upon the type of powder 222 that is to be sintered. Generally, the laser beam output of the laser 212 has a wavelength near infrared. In either a pulsed or continuous mode, the laser 212 can be modulated on or off to selectively produce a laser beam which travels generally along the path shown by the arrows in FIG. 18.

To focus the laser beam, a diverging lens 236 and converging lens 238 are disposed along the path of travel of the laser beam as shown in FIG. 18. The diverging lens 236 placed between the laser 212 and convening lens 238 creates a virtual focal point between the diverging lens 236 and the laser 212. Varying the distance between the converging lens 238 and the virtual focal point, allows control of the true focal point along the laser beam path of travel on the side of the converging lens 238 remote from the laser 212. There have been many advances in the field of optics, and it is recognized that many alternatives are available to efficiently focus the laser beam at a known location.

The laser control means 216 includes computer 240 and scanning system 242. In a preferred embodiment, the computer 240 includes a microprocessor for controlling the laser 212 and a CAD/CAM system for generating the data. In the embodiment illustrated in FIG. 18, a personal computer is used.

As shown in FIG. 18, the scanning system 242 includes a prism 244 for redirecting the path of travel of the laser beam. The scanning system 242 also includes a pair of mirrors 246, 247 driven by respective galvonometers 248,249. A function generator driver 250 controls the movement of the galvonometer 248 so that the aim of the laser beam (represented by the arrows in FIG. 18) can be controlled in the target area 226. The driver 250 is operatively coupled to the computer 240 as shown in FIG. 18. It will be appreciated that alternative scanning methods are available for use as the scanning system 242, including acusto-optic scanners, rotating polygon mirrors, and resonant mirror scanners.

Figure 19:
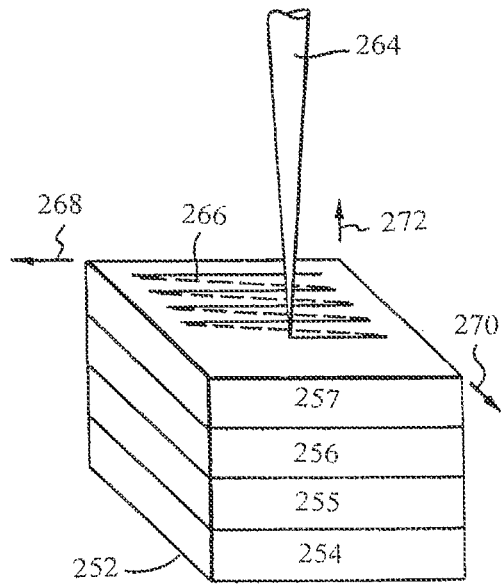
FIG. 19 is a schematic showing a portion of the layered build up of a part produced in accordance with certain embodiments of the invention.

In FIG. 19, a portion of 252 is schematically illustrated and shows four layers 254-257. The aim of the laser beam 212 is directed in a raster scan pattern as at 266. As used herein, "aim" is used as a neutral term indication direction, but does not imply the modulation state of the laser 212. In accordance with the invention, layer 254 can include a first ternary compound powder (of the general formula I), layer 255 can include a different second ternary compound powder (of the general formula I), layer 256 can include the first compound powder and layer 257 can include the different second ternary compound powder.

A first portion of powder 222 is deposited in the target area 226 and selectively sintered by the laser beam 212 to produce a first sintered layer 254 (FIG. 19). The first sintered layer 254 corresponds to a first cross-section region of the desired grid. The laser beam selectively sinters only the deposited powder 222 within the confines of the defined boundaries. This process is repeated layer-by-layer with the individual layers sintered together to produce a cohesive grid, e.g., part 252 of FIG. 19.

The dimensions of the article can generally vary. In certain embodiments, the thickness (e.g., the successive layers in the sintering process) of the grid or grid strap can be between about 0.015 inch and about 0.035 inches. The height can be between about 0.45 inches and about 2.25 inches. The width can be between about 7 inches and about 15 inches.

In certain embodiments, the grids or grid straps manufactured according to the invention can be stamped using customized dies to create patterns which can be used to assemble fuel grids. The stamping can be accomplished using conventional apparatus, techniques and methods known in the art.

Further, the grid straps produced in accordance with the invention can be joined together by welding or brazing using convention apparatus, techniques and methods known to one having ordinary skill. The brazing materials include but are not limited to copper, copper-zinc, copper-zinc-nickel, nickel-chromium-phosphorus, nickel-silver, and silver alloy. Furthermore, a laser or electron beams can be used to fuse together the grid straps.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel assembly for a nuclear reactor comprising:
   a parallel, spaced array of a plurality of elongated nuclear fuel rods having an axial length;
   a lower nozzle;
   an upper nozzle,
      wherein the plurality of elongated nuclear fuel rods is supported between the lower nozzle and the upper nozzle; and
   a plurality of spaced grids arranged in tandem along the axial length of the fuel rods between the upper nozzle and the lower nozzle, each of the plurality of spaced grids or portions or parts thereof comprising:
   a plurality of sequential layers sintered together, each of the sequential layers of the plurality of sequential layers comprising:
      sintered powder, which comprises one or more ternary compounds of the general formula:

$$M_{n+1}AX_n \qquad (I)$$

wherein M is a transition metal, A is an element selected from the group A elements in the Chemical Periodic Table, X is selected from the group consisting of carbon and nitrogen, and n is an integer from 1 to 3,
   wherein the sintered powder for each of the sequential layers of the plurality of sequential layers comprises the same one or more ternary compounds or different one or more ternary compounds, and
   wherein the sequential layers remain discrete from each other after being sintered together.

2. The fuel assembly of claim 1, wherein M is selected from the group consisting of titanium, zirconium and niobium.

3. The fuel assembly of claim 1, wherein A is selected from the group consisting of aluminum, silicon and tin.

4. The fuel assembly of claim 1, wherein the one or more ternary compounds are selected from the group consisting of $Ti_2AlC$, $Ti_3AlC_2$, $Ti_4AlN_3$, $Ti_2SiC$, $Ti_3SiC_2$, $Ti_3SnC_2$, $Zr_2AlC$, $Zr_2TiC$, $Zr_2SnC$, $Nb_2SnC$, $Nb_3SiC_2$, $(Zr_xNb_{1-x})_2AlC$ wherein x is greater than zero and less than 1.

5. The fuel assembly of claim 1, wherein a molar ratio of M to A to X can be selected from the group consisting of 2:1:1, 3:1:2 and 4:1:3.

6. The fuel assembly of claim 1, wherein the one or more ternary compounds each has a density of greater than 85% of its theoretical density.

7. The fuel assembly of claim 1, wherein the one or more ternary compounds each has a density of greater than 95% of its theoretical density.

8. The fuel assembly of claim 1, wherein the fuel assembly is employed in a water reactor selected from the group consisting of a pressurized water reactor, boiling water reactor and heavy water reactor.

* * * * *